April 12, 1949.  J. C. STIMSON  2,467,165

HELIOGRAPHIC SIGNALING DEVICE

Filed May 11, 1944

INVENTOR;
JONATHAN CASS STIMSON

BY Bruninga & Sutherland

ATTORNEYS

Patented Apr. 12, 1949

2,467,165

UNITED STATES PATENT OFFICE 2,467,165

HELIOGRAPHIC SIGNALING DEVICE

Jonathan Cass Stimson, Evanston, Ill.

Application May 11, 1944, Serial No. 535,074

6 Claims. (Cl. 116—20)

This invention pertains to signalling devices employing mirrors, and more particularly to portable pocket size devices used for sun signalling to distant searchers after lost persons. Such devices should not only be portable but compact, so as to enable the same to be readily carried on the person.

One of the objects of this invention, therefore, is to provide a device of the character described, which is not only designed for free manipulation with reference to a moving target, such as an airplane, so that the operator may aim the device at the target and project light from a distant source, such as from the sun, on the target, but which is compact.

Another object of this invention is to provide a device of the character described which is not only light in weight but practically unbreakable in ordinary use.

Further objects will appear from the detail description in which will be disclosed an illustrative embodiment of this invention. It is to be understood, however, that this invention is susceptible of various embodiments within the scope of the appended claims.

Figure 1:
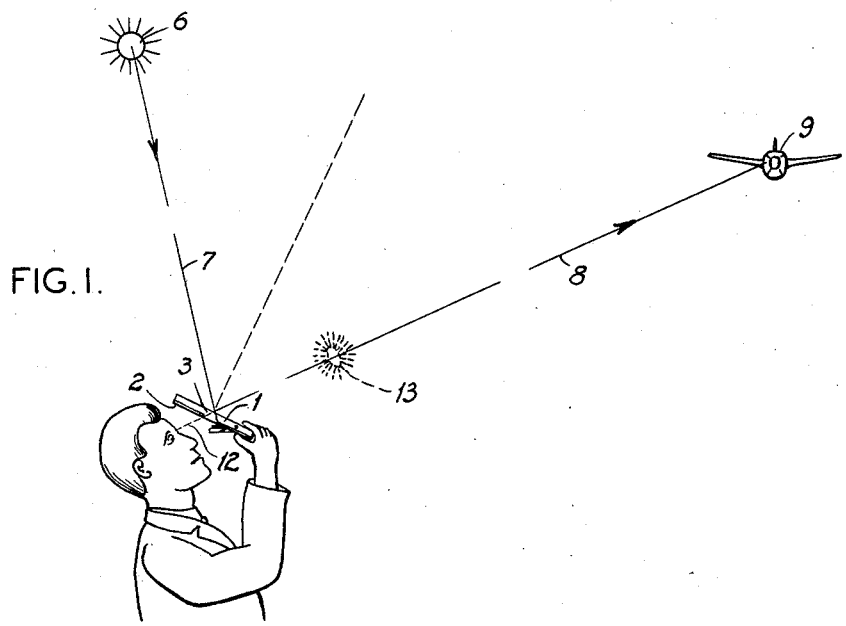

In the drawing, Figure 1 is a diagram illustrating the method of using the device embodying this invention.

Figure 2:
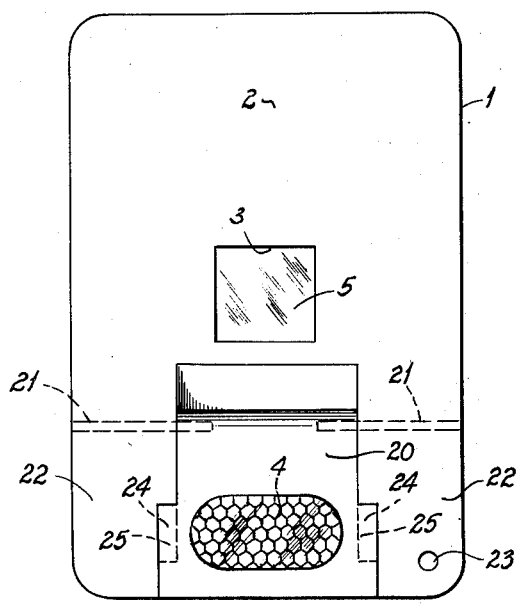
Figure 3:
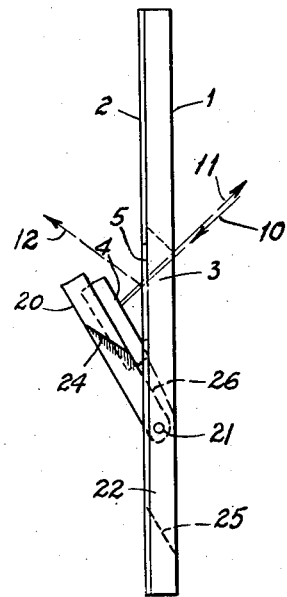

Figure 2 is a rear view of an embodiment of this invention with a movable part thereof in collapsed position; and Figure 3 is a side view of Figure 2 showing the movable part in position for use.

Generally stated, and in accordance with an illustrative embodiment of this invention, the device comprises a mirror adapted to receive light from a distant source, in order to project the light on the target, and this mirror is provided with a window. A reflecting surface is operatively opposed to the mirror and a retro-directive reflector (see G. A. Van Lear, Jr., in The Journal of the Optical Society of America, vol. 30, No. 10, pp. 462–487, October, 1940, particularly pages 463, etc.) is movable from a position substantially within the confines of the mirror to a position for cooperation with the opposed reflecting surface. This retro-directive reflector may be adjustable to a series of operative positions with respect to the opposed reflecting surface.

Referring now to the accompanying drawings, 1 designates a plate or support which is transparent and provided with a mirror surface 2, part of which is interrupted to provide a window 3. A retro-directive reflector 4 is arranged to cooperate with a reflecting surface 5 which is the back side of that portion of the transparent plate from which the mirror-surface 2 has been omitted and which is opposed to the reflecting surface of the mirror 2. Plate 1 may be made of glass or of a transparent plastic or artificial resin, such as methyl methacrylate. The retro-directive reflector 4 may be of any suitable form, but is conveniently in the form of a triple reflector of the totally reflecting type. In order to reduce cost, and in order to make the reflector 4 substantially flat, it may be formed of a series of contiguous or merging triple reflectors. This reflector 4 may be formed of pressed glass or of plastic in accordance with applicant's Patent No. 2,022,639.

If the device is positioned, as shown in Figure 1, light from a distant source 6, such as the sun, will send a beam 7 onto the mirror 2 and this beam will be reflected as shown at 8 to a target 9. Part of the light beam will pass through the window 3, as shown at 10, and striking the retro-directive reflector 4 will be turned back upon itself, as shown at 11, towards the source by passing through the window. Part of this beam 11 will, however, be reflected by the surface 5 in the direction as shown at 12 and, as shown at Figure 1, this beam 12 may be brought into alignment with the beam 8 and an image of the sun will appear at 13.

The mode of operation is indicated schematically at Figure 1. The signal man or operator grasps the device between the thumb and forefinger of one or both hands with the mirror facing outward, and generally towards both the sun 6 and the target 9, which latter may be an airplane in flight. The device is brought close enough to one eye so that the operator peers over the retro-directive reflector 14 through the transparent window 3 and sees the target in a wide and unobstructed field of view. The operator then directs his attention away from the target and rotates the device slowly and searchingly until a bright phantom image of the sun appears in and beyond the window, as shown at 13; this is then aligned with the target.

To a completely inexperienced operator, finding of the phantom may require some little experimentation. Once the phantom, however, has been seen and the operation of the device understood, the operator instinctively rotates it to a position closely enough approximating the bisection of the angle between the sun and the target, for the phantom to be brought into view almost instinctively. By the time the phantom is found the target may and probably has passed out of the field of the window. The operator, however, knows its approximate position, and while he keeps his eye fixed intently on the phantom, he slowly rotates the device so that the phantom moves towards the target, which is again found and brought back into the field of the window. With both the phantom and target in view, the mirror has now been rotated to approximately the correct angle. The operator steadies himself as best he may and superimposes the phantom upon the target, at which time a sunlight signal is flashed from the mirror to the target.

The retro-directive reflector 4 is mounted on a carrier 20, into which the reflector is set. The carrier is pivoted by pins 21 between spaced legs 22 on the plate, and one of these legs may have a hole 23 to receive a cord. This enables the carrier 20 with its reflector 4 to be swung into the opening and with the shoulders 24 engaging the shoulders 25, so that the reflector 4 will be substantially within the confines of the plate in order to enable it to take up a small space, since the reflector can be substantially within the confines of the carrier. The carrier with its reflector 4, however, may be swung into cooperative position with respect to the reflecting surface 5, the carrier taking against stop 26 on the plate. The fit between the carrier and the plate is made sufficiently tight so that the reflector 4 may occupy a series of adjusted positions with reference to the surface 5.

As previously noted, the plate 1 can be made of plastic or artificial resin, such as methyl methacrylate, and the carrier 20 and the retro-directive reflector 4 can be made of the same material. This not only provides a device which is light in weight, but practically unbreakable in ordinary use. In order to provide the mirror surface 2, the plate 1 may be cast against a smooth mold face such as plate glass. The mirror can then be applied by suitable pre-treatment of the surface followed by applying aluminum by evaporation in a manner well known to those skilled in the art.

It will be seen, therefore, that the invention accomplishes its objects. A device is provided, which may readily be positioned to receive light from the sun and aimed at a moving target, so as to project light from the sun onto the target in order to notify the occupant on the target of the whereabouts of a lost person or one desiring to communicate. The device is readily collapsible, as shown in Figure 2, so that it will occupy a small space and may be readily carried in the pocket of the user. The movable part may, however, be readily moved to operative position and maintained in a series of adjusted operative positions for efficient and convenient cooperation of the reflector 4 with the reflecting surface 5. This latter is advantageous for the reason that it will enable the operator to more readily locate the image of the sun, and when it has been located, then by moving the reflector with respect to the surface 5 the image can be adjusted in intensity.

Having thus described the invention what is claimed is:

1. A signalling device designed for free manipulation with reference to a moving target, comprising, a mirror adapted to receive light from a distant source in order to project the light on the target and provided with a window, a reflecting surface operatively opposed to said mirror, and a retro-directive reflector movable from a position substantially within the confines of the mirror to a position for cooperation with said opposed reflecting surface.

2. A signalling device designed for free manipulation with reference to a moving target, comprising, a mirror adapted to receive light from a distant source in order to project the light on the target and provided with a window having a reflecting surface operatively opposed to said mirror, and a retro-directive reflector movable from a position substantially within the confines of the mirror to a position for cooperation with said opposed reflecting surfaces.

3. A signalling device designed for free manipulation with reference to a moving target, comprising, a mirror adapted to receive light from a distant source in order to project the light on the target and provided with a window, a reflecting surface operatively opposed to said mirror, and a substantially flat retro-directive reflector movable from a position substantially within the confines of the mirror to a position for cooperation with said opposed reflecting surface.

4. A signalling device designed for free manipulation with reference to a moving target, comprising, a plate provided with a reflecting surface adapted to receive light from a distant source in order to project the light on the target and provided with a window having a reflecting surface operatively opposed to said first reflecting surface, and a retro-directive reflector movable from a position within the plate to a position for cooperation with said opposed reflecting surface.

5. A signalling device designed for free manipulation with reference to a moving target, comprising, a plate provided with a reflecting surface adapted to receive light from a distant source in order to project the light on the target and provided with a window having a reflecting surface operatively opposed to said first reflecting surface, and a substantially flat retro-directive reflector movable from a position within the plate to a position for cooperation with said opposed reflecting surface.

6. A signalling device designed for free manipulation with reference to a moving target, comprising, a plate provided with a reflecting surface adapted to receive light from a distant source in order to project the light on the target and provided with a window having a reflecting surface operatively opposed to said first reflecting surface, and a reflector consisting of a series of continguous triple reflectors movable from a position within the plate to a position for cooperation with said opposed reflecting surface.

JONATHAN CASS STIMSON.

REFERENCES CITED

The following references are of record in the file of this patent:

FOREIGN PATENTS

| Number | Country | Date |
|---|---|---|
| 9,129 | Great Britain | Apr. 22, 1903 |
| 117,760 | Australia | Nov. 10, 1943 |

OTHER REFERENCES

General Electric Review, May 1944.
"Jungle, Desert, Arctic Emergencies," U. S. Army Air Forces, Flight Control Command, Safety Education Division. (Copy of this booklet is on file in Div. 34 of the Patent Office.)